(12) United States Patent
Fujieda

(10) Patent No.: US 7,044,246 B2
(45) Date of Patent: May 16, 2006

(54) HEAT EXCHANGER MOUNTING STRUCTURE FOR VEHICLE

(75) Inventor: Kenichiro Fujieda, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 153 days.

(21) Appl. No.: 10/658,347

(22) Filed: Sep. 9, 2003

(65) Prior Publication Data

US 2004/0188155 A1   Sep. 30, 2004

(30) Foreign Application Priority Data

Sep. 9, 2002   (JP) .............................. 2002-262299

(51) Int. Cl.
*B60K 11/04* (2006.01)
*B60K 28/10* (2006.01)
*B60J 7/00* (2006.01)

(52) U.S. Cl. .................... 180/68.4; 180/68.6; 180/274; 296/187.09

(58) Field of Classification Search ............... 180/68.4, 180/68.6, 68.5, 271, 274; 296/187.09, 187.04; B60R 21/34

See application file for complete search history.

(56) References Cited

U.S. PATENT DOCUMENTS

| | | | | |
|---|---|---|---|---|
| 4,579,184 A | * | 4/1986 | Hiramoto | 180/68.4 |
| 6,260,609 B1 | * | 7/2001 | Takahashi | 165/69 |
| 6,619,419 B1 | * | 9/2003 | Cheron et al. | 180/311 |
| 6,668,956 B1 | * | 12/2003 | Pelage et al. | 180/68.4 |
| 6,722,970 B1 | * | 4/2004 | Tanaka et al. | 454/156 |
| 6,817,404 B1 | * | 11/2004 | Frana-Guthrie et al. | 165/43 |
| 6,883,589 B1 | * | 4/2005 | Ozawa et al. | 165/41 |
| 2001/0026072 A1 | | 10/2001 | Sato et al. | |
| 2004/0045754 A1 | * | 3/2004 | Bland | 180/68.1 |
| 2004/0084236 A1 | * | 5/2004 | Okai et al. | 180/68.4 |

FOREIGN PATENT DOCUMENTS

| | | | | |
|---|---|---|---|---|
| FR | 0331540 A1 | * | 9/1989 | |
| JP | 362253523 A | * | 11/1987 | |
| JP | 404132817 A | * | 5/1992 | |
| JP | 04243628 A | * | 8/1992 | |
| JP | 2001-58519 | | 3/2001 | |
| JP | 2001158223 A | * | 6/2001 | |
| JP | 2001-277964 | | 10/2001 | |
| JP | 2005138603 A | * | 6/2005 | |

* cited by examiner

*Primary Examiner*—Christopher P. Ellis
*Assistant Examiner*—Gerald B Klebe
(74) *Attorney, Agent, or Firm*—Smith, Gambrell & Russell

(57) ABSTRACT

A heat exchanger is disposed under a hood in a front space in an engine room def fined in a vehicle body. The heat exchanger has a lower part attached to a lower member of a carrier structure attached to the vehicle body, and an upper part connected to a cross member laterally extended in the engine room and having opposite ends respectively attached to mounting walls, having inclined mounting surfaces declining toward the front, of the side members of the carrier structure. The mounting walls have weak portions that break when a force exceeding a predetermined level acts on the cross member, and turn rearward on their bending parts to allow the heat exchanger to turn rearward on its lower part.

6 Claims, 5 Drawing Sheets

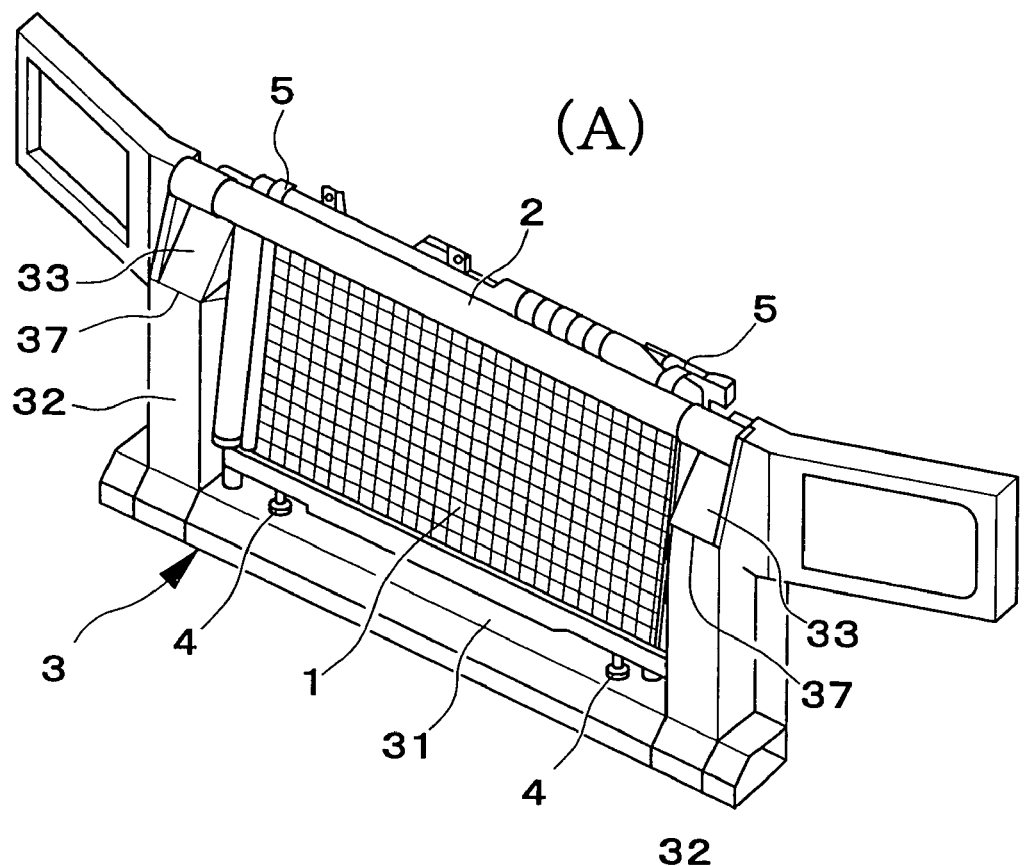
(A)
FIG.3
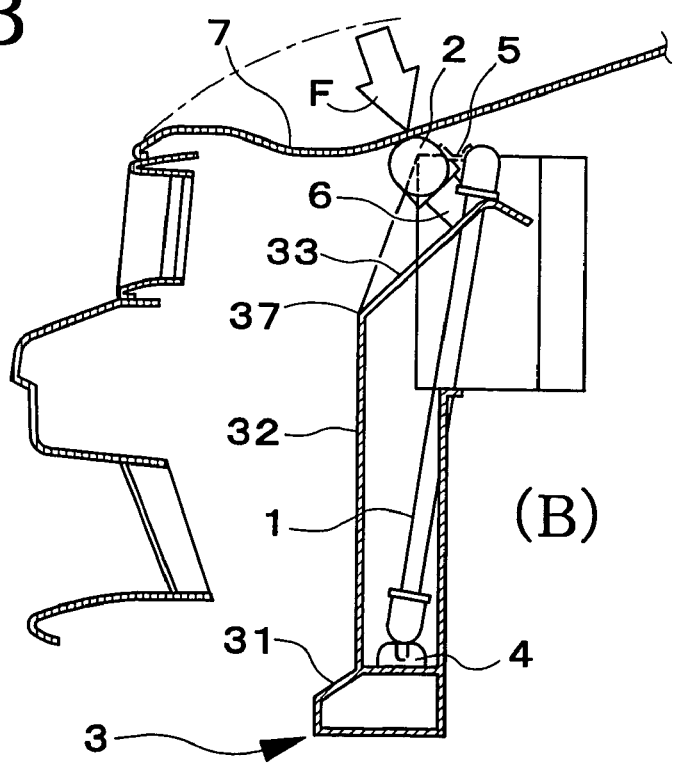
(B)

HEAT EXCHANGER MOUNTING STRUCTURE FOR VEHICLE

BACKGROUND OF THE INVENTION

1. Field of the Invention

The present invention relates to a vehicle heat exchanger mounting structure for a vehicle.

2. Description of the Related Art

Generally, a heat exchanger for a vehicle, including a radiator and a condenser for an air conditioner of the vehicle, is disposed in a front end of an engine room of the vehicle to remove heat from engine coolant with cooling air flowing into the engine room.

Referring to FIG. 5, a prior art heat exchanger "a", as disclosed in JP-A Nos. 2001-58519 and 2001-277964, for example, is attached to a radiator panel (carrier structure) "d", which extends laterally in a front end part of a vehicle body and has an upper frame "b" and a lower frame "c". Cooling air taken through an air intake opening "e" flows through the heat exchanger "a" to remove heat from engine coolant circulating therein.

A vehicle is required to secure a safety measures to protect a pedestrian from serious injury in case the vehicle collides against the pedestrian, by absorbing and reducing shocks acting on the pedestrian with the deformation of the engine food "f" of the vehicle. However, when the heat exchanger "a" is attached to front structural members of the vehicle body including the upper frame "b" and the lower frame "c" of the radiator panel "d", it is difficult to secure a large space "Delta" between the engine hood "f" and the upper frame "b" for securing the crush stroke to absorb the shocks.

SUMMARY OF THE INVENTION

The present invention has been made in view of such a problem and it is therefore an object of the present invention to provide a heat exchanger mounting structure for vehicle capable of solving such a problem.

According to a first aspect of the present invention, a heat exchanger mounting structure for mounting a heat exchanger in a front space of an engine room of a vehicle body, comprising:

a cross member laterally extending in the front space of the engine room;

supporting portions provided on the vehicle body for supporting opposite ends of the cross member, respectively;

elastic members provided between the supporting portions and the opposite ends of the cross member, respectively; and connecting members for connecting an upper part of the heat exchanger to the cross member; wherein said supporting portions are configured to deform when an external force caused by a vehicle collision is applied to the cross member such that the upper part of the heat exchanger moves rearward and downward upon deformation of the supporting portions, is provided.

According to a second aspect of the present invention, a heat exchanger mounting structure for mounting a heat exchanger in a front space of an engine room of a vehicle body, comprising:

supporting portions provided on the vehicle body for supporting left and right ends of an upper part of the heat exchanger, respectively;

connecting members for connecting the left and right ends of the upper part of the heat exchanger to the supporting portions, respectively; and elastic members provide between the supporting portion and the connecting members, respectively; wherein said supporting portions are configured to break when an external force exceeding a predetermined level caused by a vehicle collision is applied to the upper part of the heat exchanger such that the upper part of the heat exchanger moves rearward and downward upon breakage of the supporting portions, is provided.

When the heat exchanger is mounted on the vehicle body with the heat exchanger mounting structure of the present invention, the space between the engine hood and the heat exchanger is not required to be very large, and the heat exchanger is not required to be disposed at an undesirably low position on the vehicle body. Because, a sufficient crush stroke that allows the engine hood to deform effectively when the pedestrian collides against the engine food can be secured, and shocks acting on the pedestrian can effectively be absorbed and reduced, by the deformation or breakage of the mounting portion provided on a vehicle body which cause the rearward and downward displacement of the upper part of the heat exchanger.

BRIEF DESCRIPTION OF THE DRAWINGS

The above and other objects, features and advantages of the present invention will become more apparent from the following description taken in connection with the accompanying drawings, in which:

FIG. 3(A) is a schematic perspective view of the heat exchanger mounting structure shown in FIG. 2 (A) in a state where supporting portions of the carrier structure have been broken;

FIG. 3(B) is a longitudinal sectional view of the heat exchanger mounting structure shown in FIG. 2 (A) in a state shown in FIG. 3(A);

DESCRIPTION OF THE PREFERRED EMBODIMENTS

First Embodiment

Figure 1:
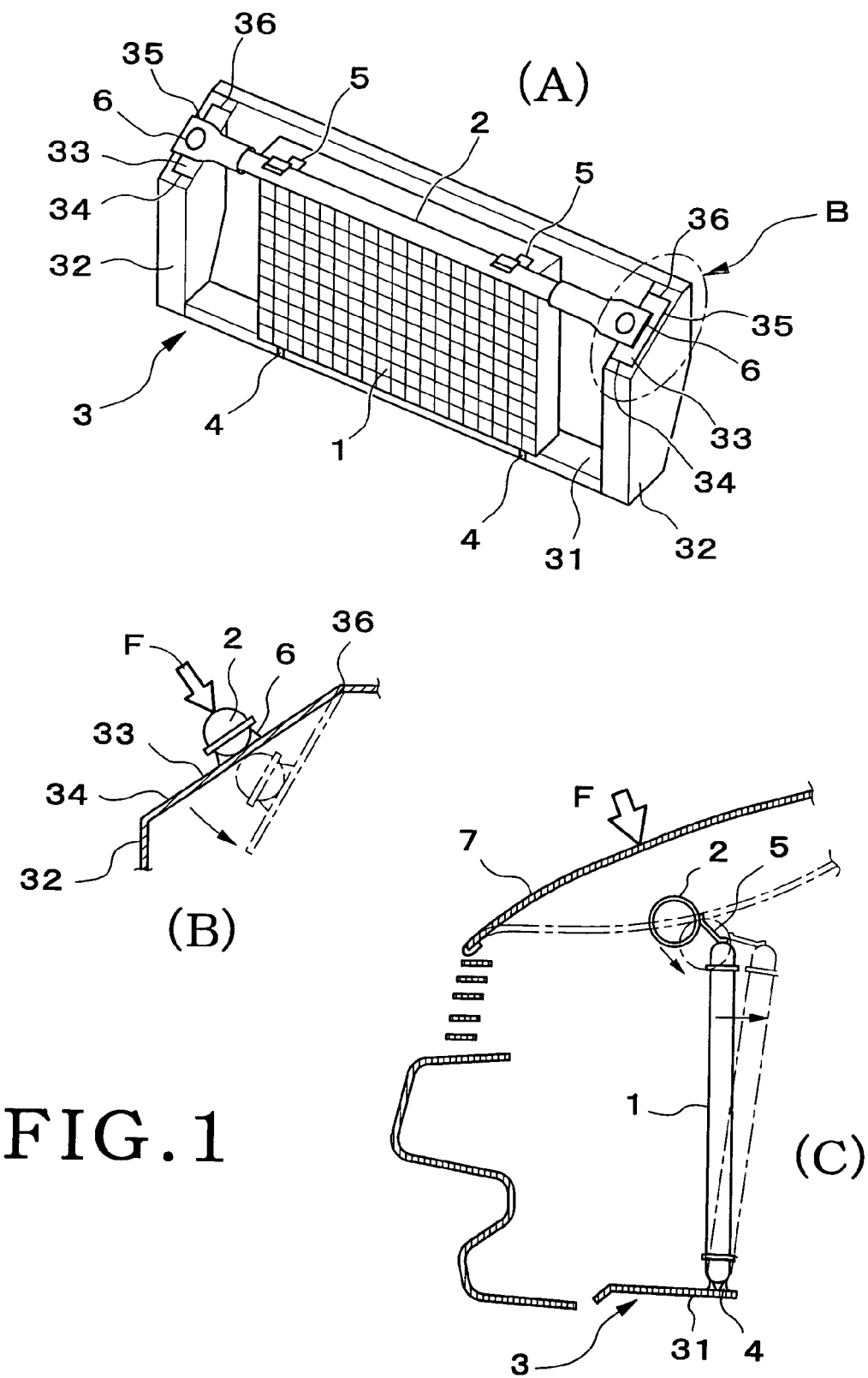
FIG. 1(A) is a schematic perspective view of a heat exchanger mounting structure in a first embodiment according to the present invention, in which a heat exchanger is attached to a carrier structure.
FIG. 1(B) is a fragmentary sectional view of a part B in FIG. 1(A)
FIG. 1(C) is a longitudinal sectional view of a front part of a vehicle body provided with the heat exchanger shown in FIG. 1(A)

Referring now to FIGS. 1(A), 1(B) and 1(C) showing a heat exchanger mounting structure in a first embodiment according to the present invention, there are shown a heat exchanger 1, a cross member 2 laterally extending across a front part of a vehicle body, and a carrier structure 3, i.e., a module carrier, attached to the vehicle body. The heat exchanger 1 is formed by assembling an engine cooling radiator, a condenser of an air conditioner, and accessories including a cooling fan. The radiator and the condenser of the air conditioner are arranged laterally or longitudinally, and the cooling fan is disposed behind the assembly of the radiator and the condenser of the air conditioner. A lower part of the heat exchanger 1 is attached to a lower member 31 of the carrier structure 3 with elastic members 4 made of rubber, for example, held between the lower part of the heat exchanger 1 and the lower member 31. An upper part of the heat exchanger 1 is connected to the cross member 2 by connecting members 5.

Opposite ends of the cross member 2 are attached to supporting portions of the upper mounting walls 33 of the opposite side members 32 of the carrier structure 3 with elastic members 6 made of rubber, for example, held between the opposite ends of the cross member 2 and the upper mounting walls 33, respectively. The supporting portions of the upper mounting walls 33 to which the opposite ends of the cross member 2 are attached break when a force exceeding a predetermined level is exerted on the cross member 2.

As shown in FIG. 1(A), the side members 32 of the carrier structure 3 have the upper mounting walls 33 having inclined mounting surfaces declining toward the front. The end parts of the cross member 2 are attached to the upper mounting walls 33 with the elastic members 6 held between the end parts of the cross member 2 and the upper mounting walls 33, respectively. The supporting portions of the upper mounting walls 33 have lateral weak portions 34 laterally extending on the front side of the end parts of the cross member 2, respectively, and longitudinal weak portions 35 obliquely longitudinally extending from the outer ends of the lower weak portions 34, respectively. The elastic members 4 and 6 absorb vibrations of the heat exchanger 1 generated while the vehicle is running.

When the vehicle collides against a pedestrian, for example, the hood 7 is crushed and deformed as indicated by two-dot chain lines in FIG. 1(C) and a external force "F" acts on the cross member 2. Consequently, the lateral weak portions 34 and the longitudinal weak portions 35 break, the upper mounting walls 33 are turned downward on bending parts 3 6 as shown in FIG. 1(B), and the cross member 2 is displaced downward. Therefore, the heat exchanger 1 having the upper part connected to the cross member 2 by the connecting members 5 turns rearward on the lower end thereof seated on the elastic members 4. Thus, the deformation of the hood 7 is not obstructed by the heat exchanger 1. The shock of collision is absorbed and reduced effectively by the breakage of the weak portions 34 and 35 and the rearward displacement of the cross member 2.

Since the upper part of the heat exchanger 1 is connected to the cross member 2, the opposite ends of the cross member 2 are attached to the upper mounting walls 33 of the side members 32 of the carrier structure 3, and the upper mounting walls 33 have the weak portions 34 and 35, the space "Delta" between the hood 7 and the heat exchanger 1 does not need to be very large, the heat exchanger 1 does not need to be disposed at an undesirably low position on the vehicle body, and a sufficient crush stroke that allows the hood 7 to be crushed effectively when the vehicle collides against a pedestrian can be secured and the shock of collision that may otherwise act on the pedestrian can effectively be absorbed and reduced. The shock absorbing ability of the heat exchanger mounting structure can easily and selectively determined by properly adjusting the breaking strength of the upper mounting walls 33 of the side members 32 of the carrier structure 3, and the strength and shape of the connecting members 5.

Since the cross member 2 is displaced downward and the upper part of the heat exchanger 1 is displaced obliquely rearward by the external impact force, the heat exchanger 1 and the accessories including the cooling fan are scarcely damaged, which reduces greatly repair part costs in repairing the vehicle damaged by a light collision.

Second Embodiment

Figure 2:
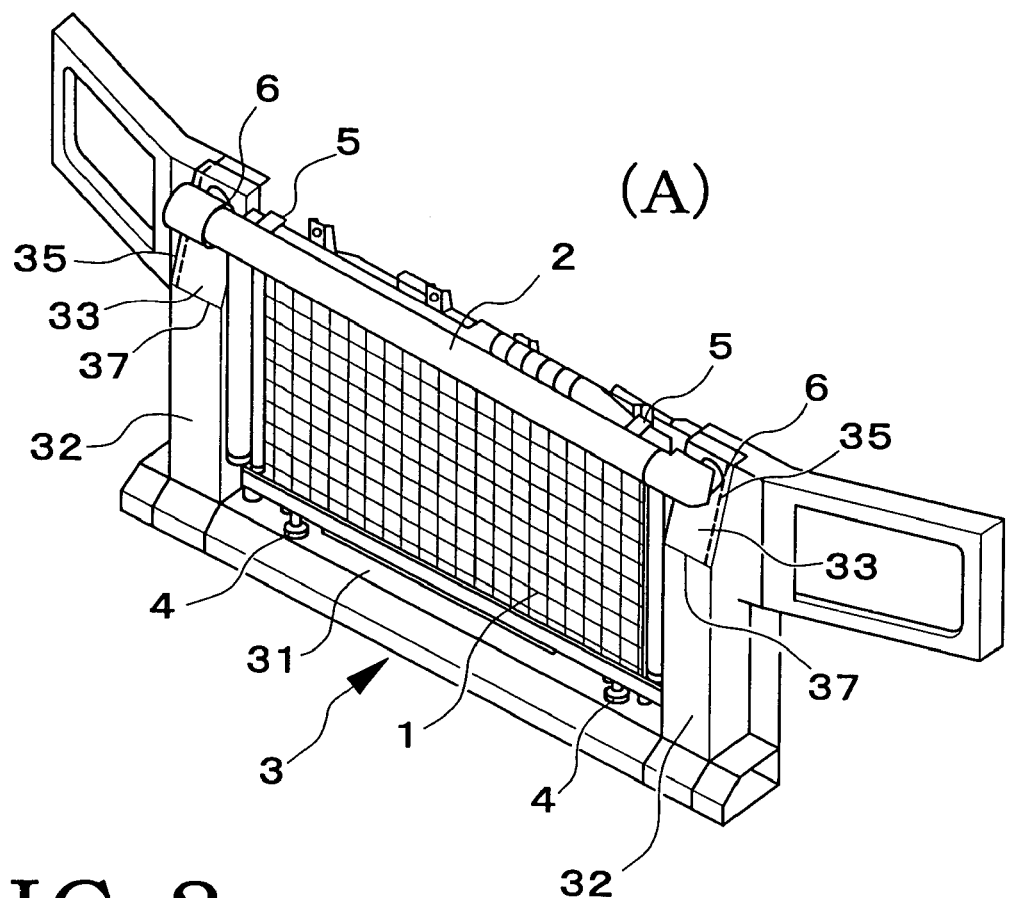
FIG. 2(A) is a schematic sectional view of a heat exchanger mounting structure in a second embodiment according to the present invention, in which a heat exchanger is attached to a carrier structure.
FIG. 2(B) is a longitudinal sectional view of a front part of a vehicle body provided with the heat exchanger shown in FIG. 2(A)
Figure 2:
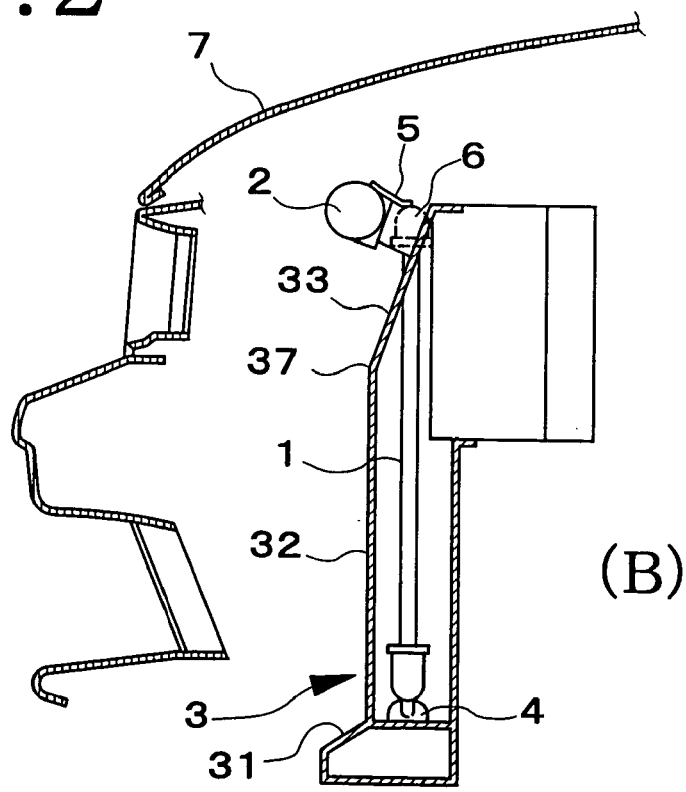

FIGS. 2 and 3 show a heat exchanger mounting structure in a second embodiment according to the present invention, which is similar in construction to the heat exchanger mounting structure in the first embodiment in which the upper mounting walls 33 of the side members 32 of the carrier structure 3 holding the opposite ends of the cross member are turned downward on the bending parts 36 at the rear ends of the longitudinal weak portions 35 by the collision shock. In FIGS. 2 and 3, parts like or corresponding to those shown in FIG. 1 are denoted by the same reference characters. In the heat exchanger mounting structure in the second embodiment, a carrier structure 3 has side members 32 having upper mounting walls 33, to which the opposite ends of a cross member 2 are attached, provided with longitudinal weak portions 35 and capable of turning on bending parts 37 at the front ends of the longitudinal weak portions 35.

As shown in FIG. 2, a heat exchanger 1 has a lower part attached to a lower member 31 of the carrier structure 3 with elastic members 4 made of rubber or the like held between the lower part of the heat exchanger 1 and the lower member 31, and an upper part connected to a cross member 2 by connecting members 5. The side members 32 of the carrier structure 3 have upper mounting walls 33 respectively having inclined mounting surfaces declining toward the front. Opposite ends of the cross member 2 are attached to the upper mounting walls 33 with the elastic members 6 held between the end parts of the cross member 2 and the upper mounting walls 33, respectively. The upper mounting walls 33 have obliquely longitudinally extending longitudinal weak portions 35, respectively. Each of the longitudinal weak portions 35 has a rear end on the upper rear edge of the side member 33 and a front end on one end of the bending part 37 on the front side of the end part of the cross member 2 held on the upper mounting wall 33.

When a vehicle provided with the heat exchanger mounting structure collides against a pedestrian, the hood 7 of the vehicle is crushed and deformed as shown in FIG. 3(B) and a force F acts on the cross member 2. Consequently, the longitudinal weak portions 35 break, the upper mounting walls 33 are turned rearward on the bending parts 37 as shown in FIG. 3(B), and the cross member 2 is displaced downward. Therefore, the heat exchanger 1 having the upper part connected to the cross member 2 by the connecting members 5 turns rearward on the lower end thereof seated on the elastic members 4. Thus, the deformation of the hood 7 is not obstructed by the heat exchanger 1. The shock of collision is absorbed and reduced effectively by the breakage of the longitudinal weak portions 35 and the rearward displacement of the cross member 2.

Although the opposite ends of the cross member 2 are attached to the side members of the carrier structure 3 attached to the vehicle body in each of the heat exchanger mounting structures in the first and the second embodiment, the opposite ends of the cross member 2 may be attached to inclined supporting portions, declining toward the front and capable of being broken by a predetermined force, of the vehicle body with elastic members of rubber or the like held between the opposite ends of the cross member 2 and the inclined supporting portions of the vehicle body, respectively.

When the opposite ends of the cross member 2 are thus attached to the inclined supporting portions of the vehicle body, linear, lateral weak portions and linear longitudinal weak portions similar to those shown in FIG. 1 that break when a external force exceeding a predetermined level acts thereon may be formed in the inclined supporting portions or linear, longitudinal weak portions similar to those shown in FIGS. 2 and 3 that break when a force exceeding a predetermined level acts thereon may be formed in the inclined supporting portions to enable the cross member 2 to be displaced obliquely downward.

The lower part of the heat exchanger 1 may be attached to a lower part of the vehicle body instead of the lower member 31 of the carrier structure 3 with the elastic member 4 of rubber or the like held between the lower part of the heat exchanger 1 and the lower part of the vehicle body.

Although the weak portions 34 and 35 of the upper mounting walls 33 of the side members 32 to which the opposite ends of the cross member 2 are attached break and the heat exchanger 1 turns rearward on its lower part to absorb the shock in the foregoing embodiments, the core of the heat exchanger 1 may positively be crushed by the cross member 2 forced to be displaced to absorb the shock.

Although the cross member 2 is displaced by the crushed and deformed hood 7 to absorb the shock in the foregoing embodiments, a bar-shaped member other than the cross member 2 may be used. For example, the upper part of the heat exchanger 1 may be connected to a front bumper beam by connecting members, and parts holding the opposite ends of the front bumper beam may break when force exceeding a predetermined level is exerted on the front bumper beam so that the heat exchanger 1 forced to move rearward.

Third Embodiment

Figure 4:
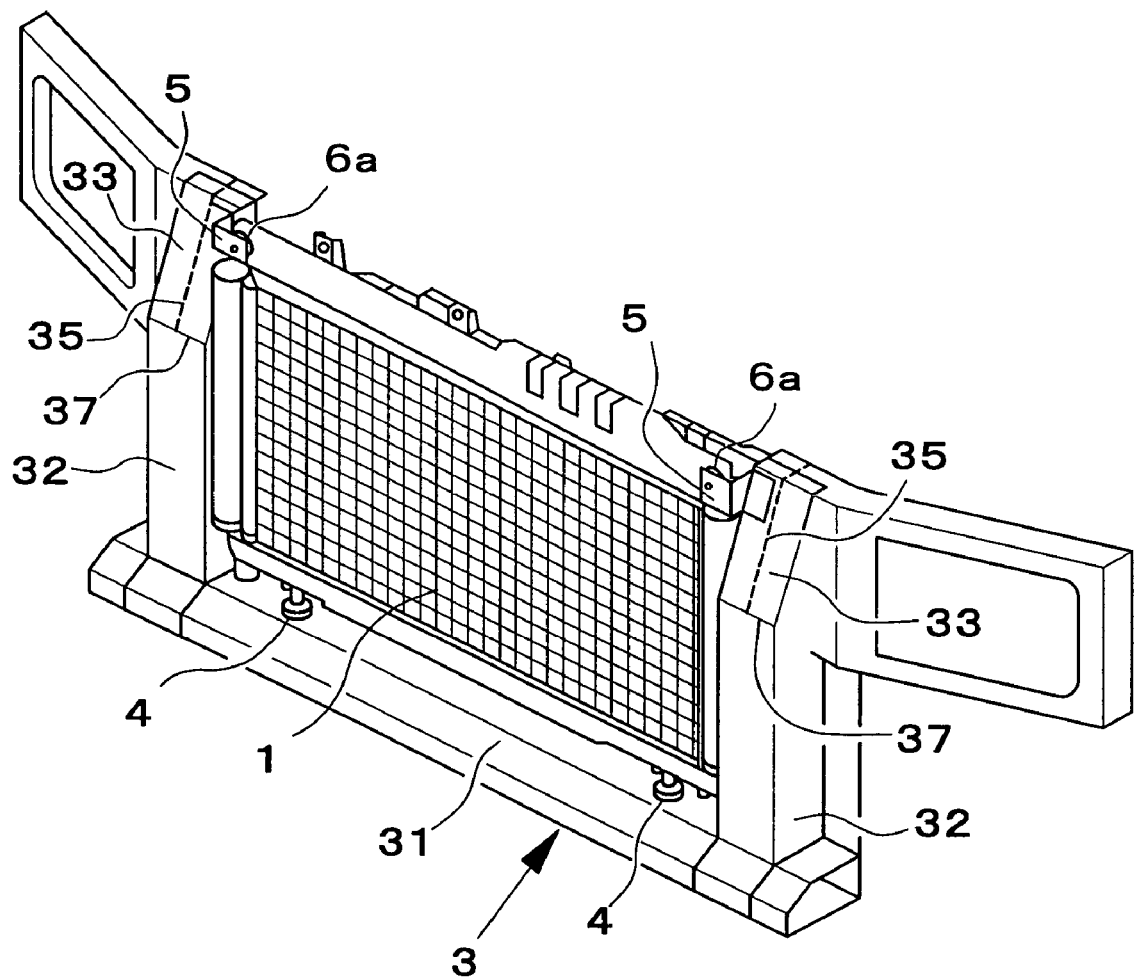
FIG. 4 is a perspective view of a heat exchanger mounting structure in a third embodiment according to the present invention, in which a heat exchanger is attached to a carrier structure.
Figure 5:
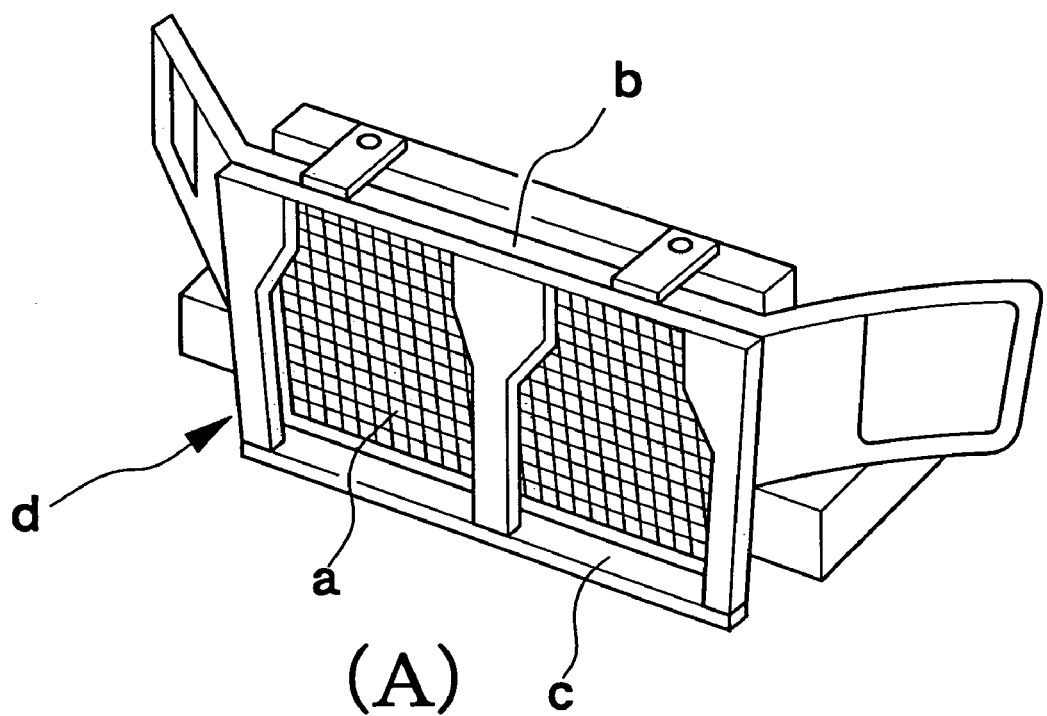
FIG. 5(A) is a prior art heat exchanger mounting structure, in which a heat exchanger is attached to a carrier structure.
FIG. 5(B) is a schematic longitudinal sectional view of a heat exchanger disposed in a front part of a vehicle body.
Figure 5:
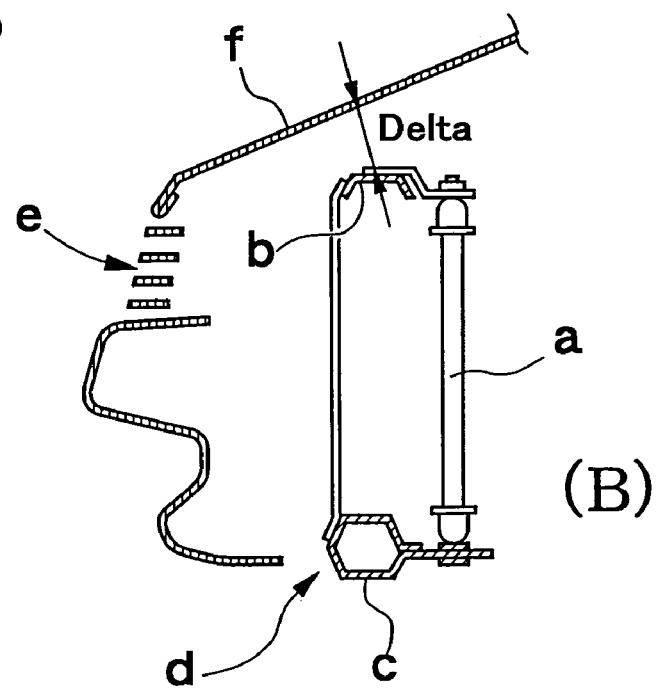

Referring now to FIG. 4 showing a heat exchanger mounting structure in a third embodiment according to the present invention, opposite ends of the upper part of a heat exchanger 1 are connected to inclined mounting walls 33, having inclined mounting surfaces declining toward the front, of side members 32 of a carrier structure 3 (or a vehicle body). The heat exchanger mounting structure in the third embodiment is not provided with any member corresponding to the cross members 2 of the first and the second embodiment shown in FIGS. 1 to 3.

A lower part of the heat exchanger 1 is attached to a lower member 31 of the carrier structure 3 (or a lower member of the vehicle body) with elastic members 4 of rubber or the like held between the lower part of the heat exchanger 1 and the lower member 31 of the carrier structure 3. Connecting members 5 are attached to the opposite ends of the upper part of the heat exchanger 1 with an elastic member 61 of rubber or the like held between the opposite ends of the upper part of the heat exchanger 1 and the connecting members 5, respectively, and the connecting members are fastened to the inclined mounting walls 33, respectively, to hold the upper part of the hat exchanger 1 in place.

The inclined mounting walls 33 to which the connecting members are fastened are provided with linear longitudinal weak portions 35, respectively. When the hood of a vehicle provided with the heat exchanger mounting structure is crushed and deformed and a force exceeding a predetermined level acts obliquely rearward on the upper part of the heat exchanger 1, the weak portions 35 of the inclined mounting walls 33 break and supporting portions to which the connecting members 5 are fastened are turned rearward on bending parts 37 at the front ends of the inclined mounting walls 33, so that the heat exchanger 1 is turned rearward on its lower part seated on the elastic members 4.

The heat exchanger mounting structure in the third embodiment shown in FIG. 4, similarly to the heat exchanger mounting structures in the first and the second embodiment shown in FIGS. 1 to 3, the space between the hood and the heat exchanger 1 does not need to be very large, the heat exchanger 1 does not need to be disposed at an undesirably low position on the vehicle body, and a sufficient crush stroke that allows the hood to be crushed effectively when the vehicle collides against a pedestrian can be secured and the shock of collision that may otherwise act on the pedestrian can effectively be absorbed and reduced.

Each of the inclined mounting walls 33 of the third embodiment shown in FIG. 4 may be provided with a lateral weak portion 34, a longitudinal weak portion 35 and a bending part 36 to enable the inclined mounting walls 33 to be bent as shown in FIG. 1(B).

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A heat exchanger mounting structure for mounting a heat exchanger in a front space of an engine room of a vehicle, comprising:
   a cross member laterally extending in the front space of the engine room;
   supporting portions provided on a vehicle body for supporting opposite ends of the cross member, respectively;
   elastic members provided between the supporting portions and the opposite ends of the cross member, respectively; and
   connecting members for connecting an upper part of the heat exchanger to the cross member; wherein
   said supporting portions are configured to deform when an external force caused by a vehicle collision is applied to the cross member such that the upper part of the heat exchanger moves rearward and downward upon deformation of the supporting portions.

2. The heat exchanger mounting structure according to claim 1, wherein said cross member is configured as a shock absorbing member disposed under an engine hood covering the engine room, and configured to absorb shock transmitted through deformation of the engine hood.

3. The heat exchanger mounting structure according to claim 1, wherein
   said supporting portions are provided on a carrier member attached on the vehicle body.

4. The heat exchanger mounting structure according to claim 1, wherein
   said supporting portions are provided with inclined mounting surfaces declining toward the front space of the engine room on which the opposite ends of the cross member are supported with the elastic members, respectively.

5. The heat exchanger mounting structure according to claim 4, wherein
said supporting portions each are provided with a weak portion configured to cause destruction of the supporting portions by its own deformation when an external force exceeding a predetermined level is applied on the cross member.

6. The heat exchanger mounting structure according to claim 5, wherein
said supporting portions are configured to deform rearward and downward along the weak portion to cause rearward and downward displacement of the upper part of the heat exchanger.

* * * * *